United States Patent
Horn et al.

(10) Patent No.: US 10,701,416 B2
(45) Date of Patent: Jun. 30, 2020

(54) CONTENT PROMOTION THROUGH AUTOMATED CURATION OF CONTENT CLIPS

(71) Applicant: Disney Enterprises, Inc., Burbank, CA (US)

(72) Inventors: David Horn, San Francisco, CA (US); Michael McNabb, San Francisco, CA (US); Jason G. Fong, South Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 7 days.

(21) Appl. No.: 16/159,335

(22) Filed: Oct. 12, 2018

(65) Prior Publication Data

US 2020/0120367 A1    Apr. 16, 2020

(51) Int. Cl.
*H04N 21/2387* (2011.01)
*H04N 21/44* (2011.01)
*H04N 21/8549* (2011.01)
*H04N 21/422* (2011.01)

(52) U.S. Cl.
CPC ... *H04N 21/2387* (2013.01); *H04N 21/42204* (2013.01); *H04N 21/44016* (2013.01); *H04N 21/8549* (2013.01)

(58) Field of Classification Search
CPC ......... H04N 21/2387; H04N 21/44016; H04N 21/8549; H04N 21/42204; H04N 21/23418; H04N 21/44008; H04N 21/4532; H04N 21/251; H04N 21/41407; H04N 21/44218; H04N 19/117; H04N 21/4755; H04N 21/482; H04N 21/25841; H04N 21/26283; H04N 21/4126; H04N 21/4332; H04N 21/4668; H04N 21/25891; G06F 3/0482; G06F 16/73; G06F 16/735
USPC .......................................................... 725/87
See application file for complete search history.

(56) References Cited

U.S. PATENT DOCUMENTS

| | | | | |
|---|---|---|---|---|
| 2006/0271997 A1* | 11/2006 | Jacoby | ............ | H04N 21/25841 725/135 |
| 2007/0136750 A1* | 6/2007 | Abanami | ........... | H04N 5/44543 725/44 |
| 2010/0180010 A1* | 7/2010 | Prestenback | ....... | H04N 21/6581 709/219 |
| 2012/0324491 A1* | 12/2012 | Bathiche | ................ | H04H 60/33 725/10 |

(Continued)

*Primary Examiner* — Cynthia M Fogg
(74) *Attorney, Agent, or Firm* — Farjami & Farjami LLP

(57) ABSTRACT

A content curation system includes a computing platform having a hardware processor and a system memory storing a content promotion software code providing a user interface. The hardware processor executes the content promotion software code to receive an initiation signal corresponding to a user action, and, in response to receiving the initiation signal, to identify multiple content items as desirable content items to the user. In addition, the content promotion software code determines a portion of the desirable content item as most desirable content to the user, and, for each most desirable content portion, obtains a content clip including that content, resulting in multiple content clips corresponding respectively to the multiple content items. The content promotion software code further outputs the content clips for playout to the user via the user interface.

20 Claims, 5 Drawing Sheets

(56) References Cited

U.S. PATENT DOCUMENTS

| | | | |
|---|---|---|---|
| 2013/0259399 A1* | 10/2013 | Ho | H04N 21/4332 382/276 |
| 2015/0012946 A1* | 1/2015 | Woods | H04N 21/84 725/41 |
| 2015/0024839 A1* | 1/2015 | Zahn | H04N 21/4781 463/31 |
| 2015/0172748 A1* | 6/2015 | Navarro | H04N 5/44543 725/41 |
| 2016/0066042 A1* | 3/2016 | Dimov | H04N 21/4147 725/34 |

* cited by examiner

CONTENT PROMOTION THROUGH AUTOMATED CURATION OF CONTENT CLIPS

BACKGROUND

Media content in the form of movie content and television (TV) programming content, for example, is consistently sought out and enjoyed by consumers. Nevertheless, the popularity of a particular item or items of such content, for example, a particular movie, TV series, or even a specific TV episode can vary widely. In some instances, that variance in popularity may be due to fundamental differences in personal taste amongst consumers. However, in other instances, the lack of consumer interaction with content may be due less to its inherent undesirability to those consumers than to their lack of familiarity with or reluctance to explore the content. Due to the resources often devoted to developing new content, the efficiency and effectiveness with which content likely to be desirable to consumers can be introduced to those consumers has become increasingly important to producers, owners, and distributors of media content.

SUMMARY

There are provided systems and methods for promoting content through automated curation of content clips, substantially as shown in and/or described in connection with at least one of the figures, and as set forth more completely in the claims.

DETAILED DESCRIPTION

Figure 1:
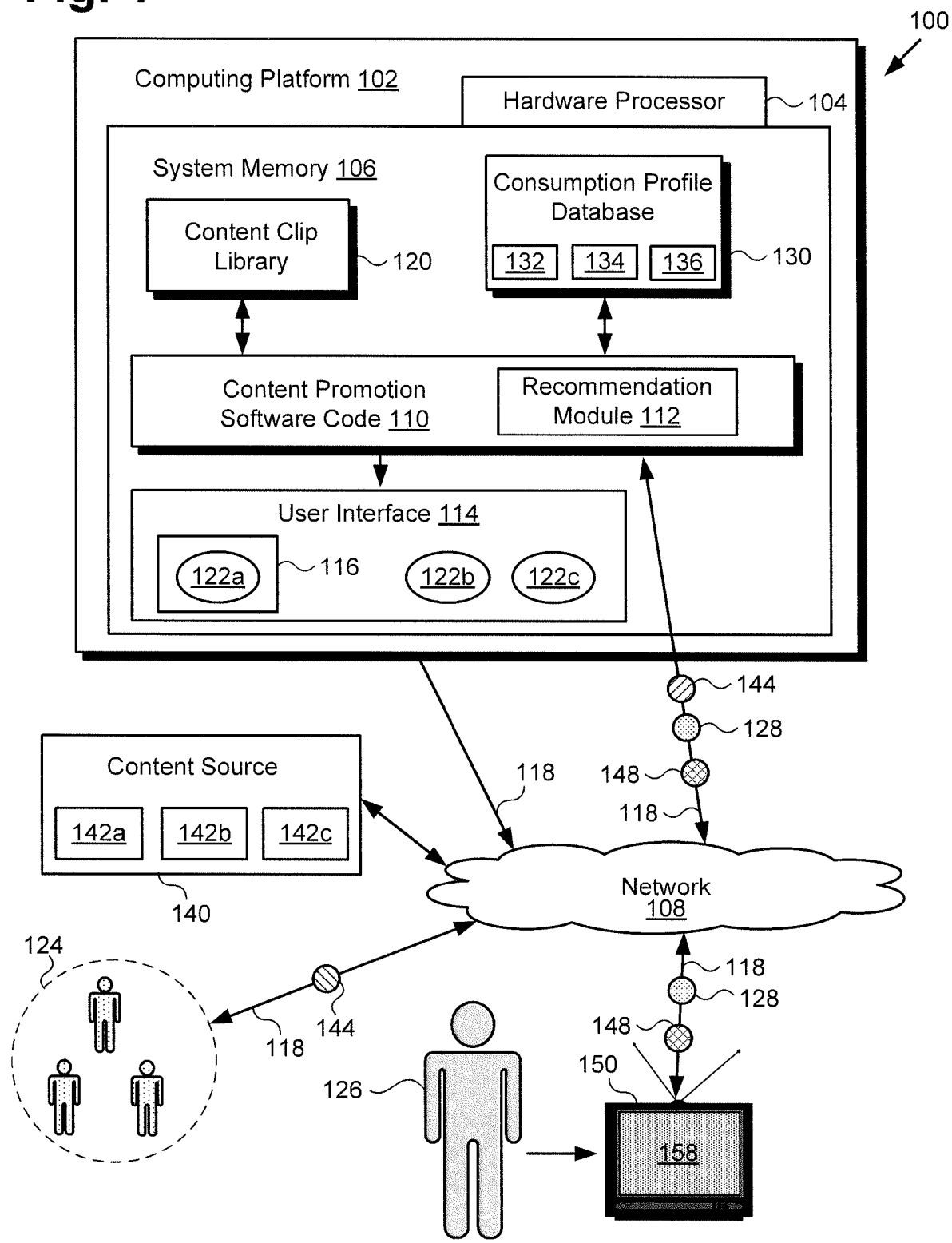
FIG. 1 shows an exemplary system for promoting content through automated curation of content clips, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for promoting content through the automated curation of content clips that address and overcome the deficiencies in the conventional art. By utilizing consumption history data specific to a user, or consumption history data for a demographic associated with the user, the present application discloses an automated content curation solution capable of identifying content likely to be desirable to the user. In addition, by using the consumption history data or associated demographic consumption history data to identify a portion of the desirable content likely to be most desirable to the consumer, the present solution advantageously isolates the portion of the content most likely to attract the user to the content. Moreover, by obtaining a content clip including the content portion likely to be most desirable to the user for playout to the user, the present solution increases the likelihood that content determined to be desirable to a user will actually be consumed and enjoyed by the user.

It is noted that, as used in the present application, the terms "automation," "automated", and "automating" refer to systems and processes that do not require the participation of a human editor or curator. Although, in some implementations, a human editor or curator may review a determination made by the automated systems and according to the automated methods described herein, that human involvement is optional. Thus, the methods described in the present application may be performed under the control of hardware processing components of the disclosed automated systems.

FIG. 1 shows an exemplary system for promoting content through automated curation of content clips, according to one implementation. As shown in FIG. 1, content curation system 100 includes computing platform 102 having hardware processor 104 and system memory 106 implemented as a non-transitory storage device. According to the present exemplary implementation, system memory 106 stores content promotion software code 110 including recommendation module 112, user interface 114 provided by content promotion software code 110, content clip library 120, and consumption profile database 130. Also shown in FIG. 1 are media playout window 116 of user interface 114, content clips 122a, 122b, and 122c, such as video clips extracted from movies or episodes of TV programming, for example, and consumption profiles 132, 134, and 136 stored in consumption profile database 130.

As further shown in FIG. 1, content curation system 100 is implemented within a use environment including communication network 108, personal communication device 150 including display 158, and user 126 of personal communication device 150. In addition, FIG. 1 shows network communication links 118 of communication network 108 interactively connecting personal communication device 150 with content curation system 100. Also shown in FIG. 1 are content consumer population 124, content source 140 providing content items 142a, 142b, and 142c, such as movies or TV programming content corresponding respectively to content clips 122a, 122b, and 122c, usage data 144 for content consumer population 124, initiation signal 128, and rejection data 148.

It is noted that, although the present application refers to content promotion software code 110 as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to hardware processor 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is further noted that although FIG. 1 depicts content promotion software code 110, content clip library 120, and consumption profile database 130 as being co-located in system memory 106, that representation is merely provided as an aid to conceptual clarity. More generally, content curation system 100 may include one or more computing platforms 102, such as computer servers for example, which may be co-located, or may form an interactively linked but distributed system, such as a cloud based system, for instance. As a result, hardware processor 104 and system memory 106 may correspond to distributed processor and memory resources within content curation system 100.

According to the implementation shown by FIG. 1, user 126 may utilize personal communication device 150 to interact with content curation system 100 over communication network 108. In one such implementation, computing platform 102 may correspond to one or more web servers, accessible over a packet-switched network such as the Internet, for example. Alternatively, computing platform 102 may correspond to one or more computer servers supporting a local area network (LAN), or included in another type of limited distribution network.

Although personal communication device 150 is shown as a smart TV in FIG. 1, that representation is also provided merely as an example. More generally, personal communication device 150 may be any suitable mobile or stationary personal communication device or system that implements data processing capabilities sufficient to support connections to communication network 108, and implement the functionality ascribed to personal communication device 150 herein. For example, in other implementations, personal communication device 150 may take the form of a desktop computer, a laptop computer, a tablet computer, a smartphone, an e-reader or a gaming console, for example.

User 126, who may be a consumer of media content such as movies, TV programming content, music, video games, or digital books, for example, may utilize personal communication device 150 to interact with content curation system 100 via user interface 114. For example, user 126 may utilize media playout window 116 of user interface 114 to view content clips 122a, 122b, and 122c rendered on display 158 of personal communication device 150. Display 158 of personal communication device 150 may take the form of a liquid crystal display (LCD), a light-emitting diode (LED) display, an organic light-emitting diode (OLED) display, or another suitable display screen that performs a physical transformation of signals to light.

Figure 2:
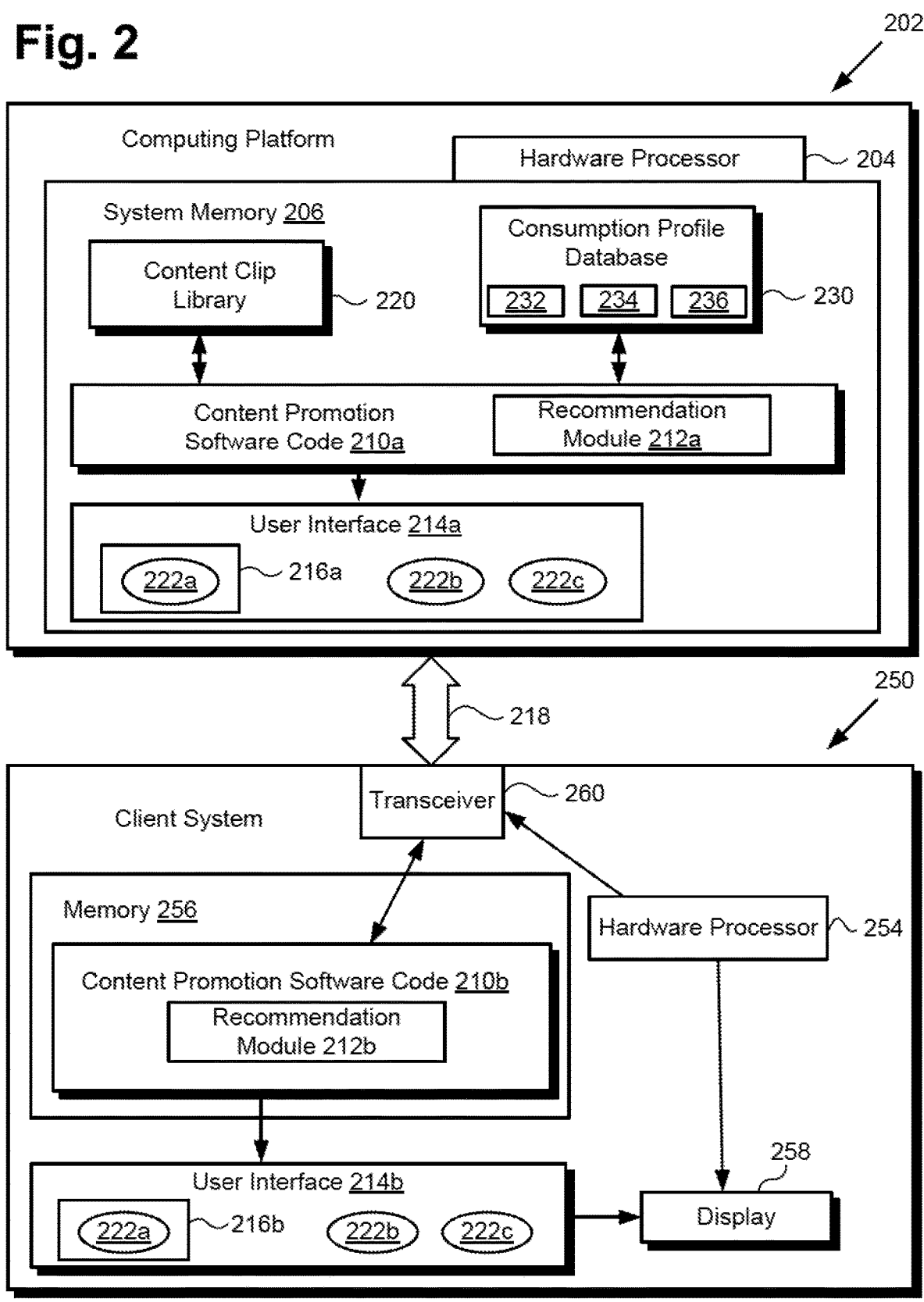
FIG. 2 shows a more detailed exemplary representation of a personal communication device suitable for use in performing automated curation of content clips, in combination with a computer server.

FIG. 2 shows a more detailed representation of exemplary personal communication device 250 in combination with computing platform 202 implemented as a computer server. As shown in FIG. 2, personal communication device 250 is communicatively coupled to computing platform 202 over network communication link 218. Computing platform 202 includes hardware processor 204, and system memory 206 storing content clip library 220, consumption profile database 230 including consumption profiles 232, 234, and 236, and content promotion software code 210a including recommendation module 212a and providing user interface 214a.

As further shown in FIG. 2, personal communication device 250 includes hardware processor 254, memory 256 implemented as a non-transitory storage device storing content promotion software code 210b including recommendation module 212b, and user interface 214b provided by content promotion software code 210b. As also shown in FIG. 2, personal communication device 250 includes transceiver 260, and display 258 for rendering user interface 214b.

Network communication link 218 and computing platform 202 having hardware processor 204 and system memory 206, correspond respectively in general to network communication link 118 and computing platform 102 having hardware processor 104 and system memory 106, in FIG. 1. In addition, content promotion software code 210a including recommendation module 212a, and user interface 214a, in FIG. 2, correspond respectively in general to content promotion software code 110 including recommendation engine 112, and user interface 114, in FIG. 1. In other words, content promotion software code 210a including recommendation module 212a, and user interface 214a, may share any of the characteristics attributed to corresponding content promotion software code 110 including recommendation module 112, and user interface 114, by the present disclosure, and vice versa.

It is also noted that content clip library 220 and consumption profile database 230 including consumption profiles 232, 234, and 236, in FIG. 2, correspond respectively in general to content clip library 120 and consumption profile database 130 including consumption profiles 132, 134, and 136, in FIG. 1. Moreover, media playout window 216a, and content clips 222a, 222b, and 222c correspond respectively to media playout window 116, and content clips 122a, 122b, and 122c. Thus, media playout window 216a, and content clips 222a, 222b, and 222c may share any of the characteristics attributed to media playout window 116, and content clips 122a, 122b, and 122c by the present disclosure, and vice versa.

Personal communication device 250 and display 258 correspond in general to personal communication device 150 and display 158, in FIG. 1, and those corresponding features may share any of the characteristics attributed to either corresponding feature by the present disclosure. Thus, like personal communication device 150, personal communication device 250 may take the form of a smart TV, desktop computer, laptop computer, tablet computer, smartphone, e-reader or gaming console, for example. In addition, and although not shown in FIG. 1, personal communication device 150 may include features corresponding to hardware processor 254, transceiver 260, memory 256 storing content promotion software code 210b including recommendation module 212b, and user interface 214b provided by content promotion software code 210b. Moreover, like display 158, display 258 may be implemented as an LCD, an LED display, an OLED display, or any other suitable display screen that performs a physical transformation of signals to light.

With respect to content promotion software code 210b, it is noted that in some implementations, content promotion software code 210b may be a direct-to-consumer application providing user interface 214b for exchanging data, such as data corresponding to initiation signal 128 and rejection data 148 with computing platform 102/202. In some of those implementations, for example, content promotion software code 210b may not include recommendation module 212b.

However, in other implementations, content promotion software code 210b may be a direct-to-consumer application including all of the features of content promotion software code 110/210a, and may be capable of executing all of the same functionality. That is to say, in some implementations, content promotion software code 210b corresponds to content promotion software code 110/210a and may share any of the characteristics attributed to those corresponding features by the present disclosure. Furthermore, it is noted that media playout window 216b corresponds in general to media playout window 116/216a and may share any of the characteristics attributed to that corresponding feature by the present disclosure.

According to the exemplary implementation shown in FIG. 2, content promotion software code 210b is located in memory 256, having been received via network communication link 118/218, either from computing platform 102/202 or an authorized third party source of content promotion software code 210b. In one implementation, network communication link 118/218 corresponds to transfer of content promotion software code 210b over a packet-switched network, for example.

Once transferred, for instance by being downloaded over network communication link 118/218, content promotion software code 210b may be persistently stored in memory 256, and content promotion software code 210b may be executed on personal communication device 150/250 by hardware processor 254. Hardware processor 254 may be the central processing unit (CPU) for personal communication device 150/250, for example, in which role hardware processor 254 runs the operating system for personal communication device 150/250 and executes content promotion software code 210b. Thus, in some implementations, the computing platform for performing content promotion through automated curation of content clips may be part of personal communication device 150/250.

Figure 3A:
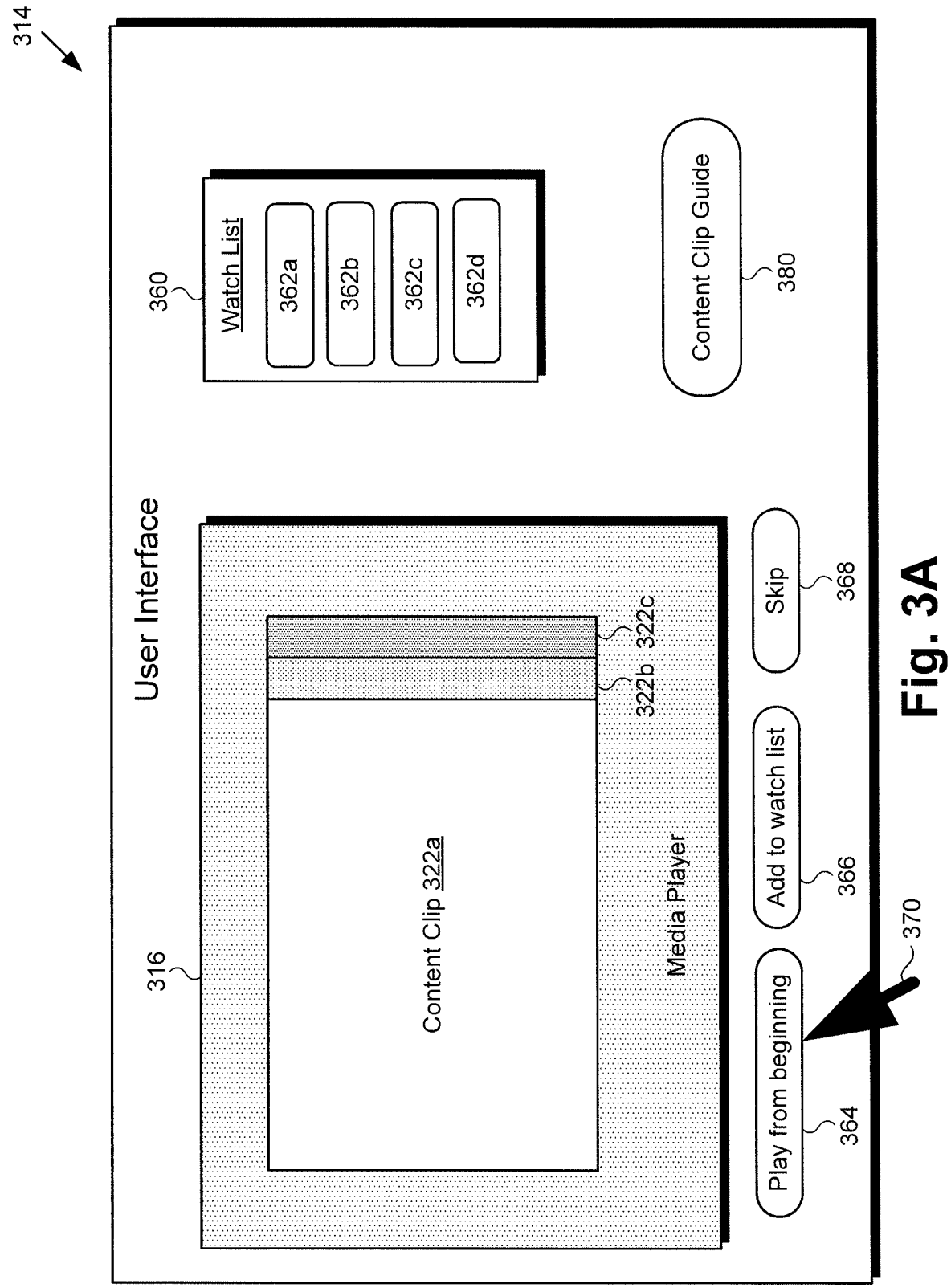
FIG. 3A shows an exemplary user interface provided by a system for promoting content through automated curation of content clips, according to one implementation.

FIG. 3A shows exemplary user interface 314 provided by content promotion software code 110/210a/210/210a/210b, according to one implementation. As shown in FIG. 3A exemplary user interface 314 is displaying media playout window 316 for playing out content clips 322a, 322b, and 322c, play from beginning selector 364, add to watch list selector 366, and skip selector 368, as well as watch list 360 including content links 362a, 362b, 362c, and 362d. Also shown in FIG. 3A is content clip guide 380, which is analogous to an electronic program guide (EPG) for content clips 322a, 322b, and 322c, and cursor 370 usable by user 126 to interact with user interface 314.

User interface 314, media playout window 316, and content clips 322a, 322b, and 322c correspond respectively in general to user interface 114/214a/214b media playout window 116/216a/216b, and content clips 122a/222a, 122b/222b, and 122c/222c, in FIGS. 1 and 2. That is to say, user interface 314, media playout window 316, and content clips 322a, 322b, and 322c may share any of the characteristics attributed to respective user interface 114/214a/214b media playout window 116/216a/216b, and content clips 122a/222a, 122b/222b, and 122c/222c by the present disclosure, and vice versa. Thus, although not shown in FIGS. 1 and 2, user interface 114/214a/214b may include any or all of play from beginning selector 364, add to watch list selector 366, skip selector 368, watch list 360 including content links 362a, 362b, 362c, and 362d, and content clip guide 380.

Figure 3B:
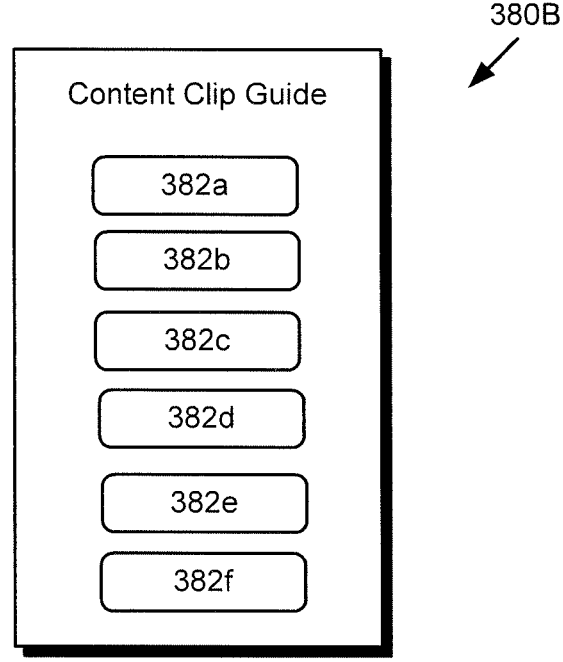
FIG. 3B shows an exemplary content clip guide accessible via the user interface shown in FIG. 3A, according to one implementation.
Figure 3C:
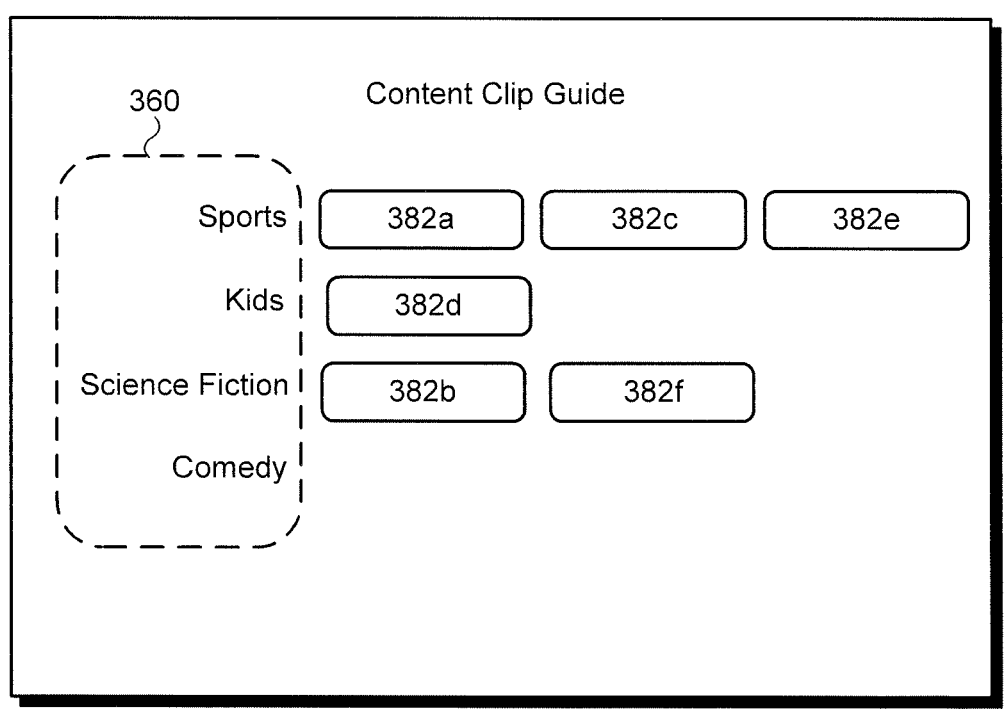
FIG. 3C shows an exemplary content clip guide accessible via the user interface shown in FIG. 3A, according to another implementation.

Referring to FIGS. 3B and 3C, FIG. 3B shows exemplary content clip guide 380B accessible via user interface 114/214a/214b/314, according to one implementation, while FIG. 3C shows exemplary content clip guide 380C accessible via a user interface 114/214a/214b/314, according to another implementation. Content clip guides 380B and 380C, in FIGS. 3B and 3C display content clip links 382a, 382b, 382c, 382d, 382e, and 382f (hereinafter "content clip links 382a-382r").

Content clip links 382a-382f correspond respectively to the content clips available for playout to user 126 through user interface 114/214a/214b/314. That is to say, content clip link 382a corresponds to content clip 122a/222a/322a, content clip link 382b corresponds to content clip 122b/222b/322b, content clip link 382c corresponds to content clip 122c/222c/322c, and so forth. Each of content clip links 382a-382f enables user 126 to access and begin playout of its associated content clip. Thus, for example, selection of content clip link 382c begins playout of content clip 122c/222c/322c via media playout window 116/216a/216b/316.

Content clip links 382a-382f may be presented in any of a variety of formats. For example, as shown in FIG. 3B, in one implementation, content clip links 382a-382f may be displayed as a list. However, in other implementations, content clip links 382a-382f may be displayed as tiles, icons, or thumbnails, for example. Each of content clip links 382a-382f may include the title of a corresponding item and/or a brief description of the corresponding content item or content clip. In other words, content clip link 382c may include the title of corresponding content item 142c, as well as a brief description of corresponding content item 142c or corresponding content clip 122c/222c/322c.

As shown in FIG. 3C, in some implementations, content clip guide 380C may be displayed in a grid format that associates each of content clip links 382a-382f with its respective genre 360. For example, of the content clips curated for user 126 and available for playout via user interface 114/214a/214b/314, content clip guide 380C identifies content clip links 382a, 382c, and 382e as linking to content clips of sports content. Analogously, content clip guide 380C identifies content clip link 382d as linking to content clips of content suitable for kids and content clip links 382b and 382f as linking to content clips of science fiction content.

Figure 4:
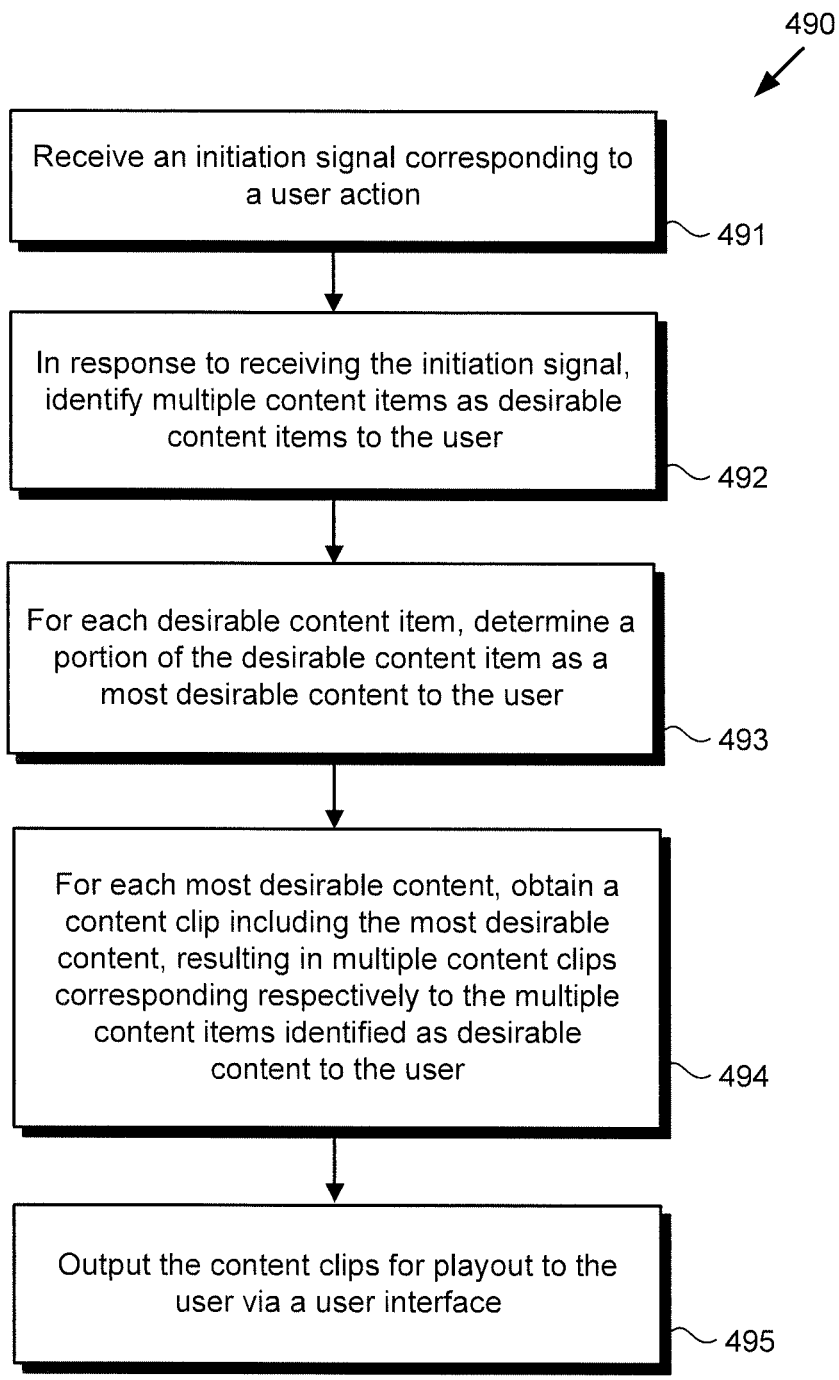
FIG. 4 shows a flowchart presenting an exemplary method for promoting content through automated curation of content clips, according to one implementation.

The functionality of content promotion software code 110/210a/210b will be further described by reference to FIG. 4. FIG. 4 shows flowchart 490 presenting an exemplary method for use by a system, such as content curation system 100, or personal communication device 150/250, for promoting content through automated curation of content clips. With respect to the method outlined in FIG. 4, it is noted that certain details and features have been left out of flowchart 490 in order not to obscure the discussion of the inventive features in the present application.

Referring to FIG. 4 in combination with FIGS. 1, 2, 3A, 3B, and 3C, flowchart 490 begins with receiving initiation signal 128 corresponding to an action performed by user 126 (action 491). For example, in one implementation, initiation signal 128 may correspond to selection of an application icon corresponding to content promotion software code 110/210a/210b and either resident on personal communication device 150/250 or accessible via communication network 108 and network communication links 118/218, that initiates execution of content promotion software code 110/210a/210b.

As shown by FIG. 1, in one implementation, initiation signal 128 may be transmitted by personal communication device 150/250, using transceiver 260, to computing platform 102/202 via network 108 and network communication links 118/218. In those implementations, initiation signal 128 may be received by content promotion software code 110/210a, executed by hardware processor 104/204 of computing platform 102/202. However, in other implementations, initiation signal 128 may be received from user interface 214b/314 by content promotion software code 210b, executed by hardware processor 254 of personal communication device 150/250.

Flowchart 490 continues with, in response to receiving initiation signal 128, identifying multiple content items 142a, 142b, and 142c as desirable content to user 126 (action 492). Content items 142a, 142b, and 142c may take a variety of forms. For instance, each of content items 142a, 142b, and 142c may be audio-visual content, such as a movie, a TV series, a single episode of TV programming content, or a video game, for example. Alternatively, in some implementations, each of content items may be an e-book or a music album.

In use cases in which consumption profile database 130/230 includes a consumption history specific to user 126, i.e., consumption profile 132/232, identifying content items 142a, 142b, and 142c as desirable content to user 126 may be performed by reference to consumption profile 132/232. In implementations in which initiation signal 128 is received by content promotion software code 110/210a on computing platform 102/202, identification of content items 142a, 142b, and 142c may be performed by content promotion software code 110/210a, executed by hardware processor 104/204, using recommendation module 112/212a and consumption profile 132/232.

In implementations in which initiation signal 128 is received by content promotion software code 210b via user interface 214b/314, content promotion software code 210b may access consumption profile database 130 on computing platform 102/202 using transceiver 260, communication network 108, and network communication links 118/218. In those implementations, identification of content items 142a, 142b, and 142c as desirable to user 126 may be performed by content promotion software code 210b, executed by hardware processor 254 of personal communication device 150/250, and using recommendation module 212b and consumption profile 132/232.

In use cases in which consumption profile database 130/230 does not include a consumption history specific to user 126, identifying content items 142a, 142b, and 142c as desirable content to user 126 may be performed using collaborative filtering recommendation techniques. That is to say, in some implementations, identifying content items 142a, 142b, and 142c as desirable content to user 126 may be performed by reference to a consumption profile of a demographic of content consumer population 124 determined to be similar to user 126, i.e., consumption profile 134/234. For example, even without access to a consumption history specific to user 126, a preliminary identification of content likely to be desirable to user 126 may be based on information such as the age and gender of user 126 and usage data 144 for that portion of content consumer population 124 having a similar age and the same gender.

In some implementations, a preliminary identification of content likely to be desirable to user 126 may be based on the geographic region in which user 126 resides, as well as the nature of personal communication device 150/250. For example, where personal communication device 150/250 is a gaming console, reference to a demographic of content consumer population 124 that utilizes gaming consoles may reveal that video game content is more likely to be desirable to user 126 than and e-book or music content.

In implementations in which initiation signal 128 is received by content promotion software code 110/210a, identification of content items 142a, 142b, and 142c may be performed by content promotion software code 110/210a, executed by hardware processor 104/204, using recommendation module 112/212a and consumption profile 134/234 of a demographic of content consumer population 124 determined to be similar to user 126.

In implementations in which initiation signal 128 is received by content promotion software code 210b via user interface 214b/314, content promotion software code 210b may access consumption profile database 130 on computing platform 102/202 using transceiver 260, communication network 108, and network communication links 118/218. In those implementations, identification of content items 142a, 142b, and 142c as desirable to user 126 may be performed by content promotion software code 210b, executed by hardware processor 254 of personal communication device 150/250, and using recommendation module 212b and consumption profile 134/234 of a demographic of content consumer population 124 determined to be similar to user 126.

Flowchart 490 continues with, for each of desirable content items 142a, 142b, and 142c, determine a portion of desirable content items 142a, 142b, and 142c as most desirable to user 126 (action 493). As noted above, content items 142a, 142b, and 142c may take a variety of forms, such as movies, TV programming, music, video games, and e-books. Nevertheless, in the interests of conceptual clarity, action 493 will be described by reference to audio-visual content such as movies and TV programming content.

By way of example, action 492 may reveal that science fiction is a preferred genre of movie or TV programming content for user 126. Accordingly, each of desirable content items 142a, 142b, and 142c may be a science fiction movie, a science fiction TV series, or an individual episode of a science fiction series. Moreover, reference to consumption profile 132/232 of user 126 or to consumption profile 134/234 of a demographic of content consumer population 124 determined to be similar to user 126 may reveal that user 126 is, or is likely to be, a fan of a particular actor. Alternatively, or in addition, reference to consumption profile 132/232 or 134/234 may reveal that user 126 enjoys, or is likely to enjoy, humor. In this specific example, determination of which portion of each of desirable content items 142a, 142b, and 142c is likely to be most desirable to user 126 may be based on the appearance of the actor admired by user 126, and/or the presence of a joke or humorous occurrence, in that portion of the content item.

As noted above, the present solution may use collaborative filtering recommendation techniques. However, according to the present inventive principles, those techniques are applied to segments of content rather than an entire piece of content itself. For a given content item, human annotators or an automated annotation system may be used to tag relatively short clips of content. The content clip annotations can be used by recommendation module 112/212a/212b to determine which part of a content item, i.e., which content clip, is likely to be most appealing to user 126.

In implementations in which content items 142a, 142b, and 142c are identified as desirable to user 126 by content promotion software code 110/210a, determination of the most desirable portion of content items 142a, 142b, and 142c to user 126 may also be performed by content promotion software code 110/210a, executed by hardware processor 104/204, using recommendation module 112/212a and consumption profile 132/232 or 134/234. However, in implementations in which content items 142*a*, 142*b*, and 142*c* are identified as desirable to user 126 by content promotion software code 210*b*, determination of the most desirable portion of content items 142*a*, 142*b*, and 142*c* to user 126 may be performed by content promotion software code 210*b*, executed by hardware processor 254, using recommendation module 212*b* and consumption profile 132/232 or 134/234.

Flowchart 490 continues with, for each most desirable portion of desirable content items 142*a*, 142*b*, and 142*c*, obtain a content clip including the most desirable portion of content, resulting in content clips 122*a*/222*a*/322*a*, 122*b*/222*b*/322*b*, and 122*c*/222*c*/322*c* corresponding respectively to desirable content items 142*a*, 142*b*, and 142*c* (action 494). That is to say, content clip 122*a*/222*a*/322*a* is a clip from desirable content item 142*a* including that portion of desirable content item 142*a* determined to be most desirable to user 126 in action 493. Similarly, content clips 122*b*/222*b*/322*b* and 122*c*/222*c*/322*c* are clips from respective desirable content items 142*b* and 142*c* including those portions of desirable content items 142*b* and 142*c* determined to be most desirable to user 126.

As noted above, desirable content items 142*a*, 142*b*, and 142*c* may take a variety of forms. For instance, desirable content items 142*a*, 142*b*, and 142*c* may be audio-visual content, such as a movie, TV series, or an episode of TV programming, as also noted above. As a result, in some implementations, content clips 122*a*/222*a*/322*a*, 122*b*/222*b*/322*b*, and 122*c*/222*c*/322*c* may be video clips. Alternatively, in some implementations, each of content clips 122*a*/222*a*/322*a*, 122*b*/222*b*/322*b*, and 122*c*/222*c*/322*c* may be a music sample or a portion of an e-book.

It is noted that content clip 122*a*/222*a*/322*a* may include any portion of desirable content item 142*a* determined to be most desirable to user 126. Thus, content clip 122*a*/222*a*/322*a* may be a clip taken from the beginning or near the beginning of desirable content item 142*a*, from the end or near the end of desirable content item 142*a*, or may be any content interval between the beginning and the end of desirable content item 142*a*. Similarly, content clips 122*b*/222*b*/322*b* and 122*c*/222*c*/322*c* may be any content intervals between the beginning and the end of respective desirable content items 142*b* and 142*c*.

It is further noted that, in some implementations, content clips 122*a*/222*a*/322*a*, 122*b*/222*b*/322*b*, and 122*c*/222*c*/322*c* may be short clips of content. For example, where content clips 122*a*/222*a*/322*a*, 122*b*/222*b*/322*b*, and 122*c*/222*c*/322*c* are video clips, content clips 122*a*/222*a*/322*a*, 122*b*/222*b*/322*b*, and 122*c*/222*c*/322*c* may have a playout duration of a few seconds, such as approximately ten to fifteen seconds, for example, or may be limited to one or a few shots.

As used in the present application, a "shot" refers to a sequence of video frames that is captured from a unique camera perspective without cuts and/or other cinematic transitions. Thus, in one implementation, one or more of content clips 122*a*/222*a*/322*a*, 122*b*/222*b*/322*b*, and 122*c*/222*c*/322*c* may correspond to a single shot of video content including multiple individual frames of video. However, in other implementations, one or more of content clips 122*a*/222*a*/322*a*, 122*b*/222*b*/322*b*, and 122*c*/222*c*/322*c* may correspond to a scene or scenes including multiple shots.

In implementations in which content items 142*a*, 142*b*, and 142*c* are identified as desirable to user 126 by content promotion software code 110/210*a*, content clips 122*a*/222*a*/322*a*, 122*b*/222*b*/322*b*, and 122*c*/222*c*/322*c* may be obtained from content clip library 120/220 by content promotion software code 110/210*a*, executed by hardware processor 104/204. In implementations in which content items 142*a*, 142*b*, and 142*c* are identified as desirable to user 126 by content promotion software code 210*b*, content promotion software code 210*b* may access content clip library 120/220 on computing platform 102/202 using transceiver 260, communication network 108/208, and network communication links 118/218. In those implementations, content clips 122*a*/222*a*/322*a*, 122*b*/222*b*/322*b*, and 122*c*/222*c*/322*c* may be obtained by content promotion software code 210*b*, executed by hardware processor 254.

Flowchart 490 can conclude with outputting content clips 122*a*/222*a*/322*a*, 122*b*/222*b*/322*b*, and 122*c*/222*c*/322*c* for playout to user 126 via user interface 114/214*a*/214*b*/314 (action 495). In one implementation, outputting content clips 122*a*/222*a*/322*a*, 122*b*/222*b*/322*b*, and 122*c*/222*c*/322*c* for playout to user 126 may include streaming one or more of content clips 122*a*/222*a*/322*a*, 122*b*/222*b*/322*b*, and 122*c*/222*c*/322*c* to user 126. For example, hardware processor 104/204 may execute content promotion software code 110/210*a* to stream content clip 122*a*/222*a*/322*a* to personal communication device 150/250 via communication network 108 and network communication links 118/218. In those implementations, hardware processor 254 of personal communication device 150/250 may be further configured to render one or more of content clips 122*a*/222*a*/322*a*, 122*b*/222*b*/322*b*, and 122*c*/222*c*/322*c* on display 158/258.

Thus, when user 126 opens an application corresponding to content promotion software code 110/210*a*/210*b*, user 126 generates initiation signal 128. As a result, user 126 can advantageously be presented with content clips 122*a*/222*a*/322*a*, 122*b*/222*b*/322*b*, and 122*c*/222*c*/322*c* each including an extract from each respective content items 142*a*, 142*b*, and 142*c* that is most likely to be desirable to him or her, i.e., starting from a scene that is predicted to be most appealing to user 126. In some implementations, user 126 can select one of content clips 122*a*/222*a*/322*a*, 122*b*/222*b*/322*b*, and 122*c*/222*c*/322*c* and be dropped into a "surf" mode. The selected content clip expands and begins playing out from the scene predicted to be most engaging to user 126. Each time user 126 opens the application, user 126 can start anew, or, in some implementations, user 126 can set an option to automatically continue surf mode from where they had last left off.

Referring to FIG. 3A, content clips 122*a*/222*a*/322*a*, 122*b*/222*b*/322*b*, and 122*c*/222*c*/322*c* may be played out via media playout window 116/216*a*/216*b*/316 of user interface 114/214*a*/214*b*/314. According to one implementation, content clips 122*a*/222*a*/322*a*, 122*b*/222*b*/322*b*, and 122*c*/222*c*/322*c* may be played out via media playout window 116/216*a*/216*b*/316 automatically and in sequence, without the intervention of user 126. In other implementations, as shown in FIG. 3A, user 126 may take specific actions to affect playout of content clips 122*a*/222*a*/322*a*, 122*b*/222*b*/322*b*, and 122*c*/222*c*/322*c*.

For example, according to the exemplary implementation shown in FIG. 3A, user interface 114/214*a*/214*b*/314 may enable user 126 to play content item 142*a* corresponding to content clip 122*a*/222*a*/322*a* from the beginning of content item 142*a*. That is to say, while viewing content clip 122*a*/222*a*/322*a* via media playout window 116/216*a*/216*b*/316, user 126 may utilize cursor 370 to activate play from beginning selector 364 to obtain content item 142*a* from content source 140 and to immediately begin playout of content item 142*a* from its beginning.

Alternatively user 126 may utilize cursor 370 to activate add to watch list selector 366 to view content item 142*a* from its beginning at a later time. In that use ease, content promotion software code 110/210a or 210b, executed by respective hardware processor 104/204 or 254, may generate content link 362a to content item 142a on watch list 360. Later selection of content link 362a by user 126 results in content 142a being retrieved, either from system memory 106/206 or 256, or from content source 140, and being rendered on display 158/258 of personal communication device 150/250.

As another alternative, in use cases in which user 126 does not enjoy content clip 122a/222a/322a, user 126 may utilize cursor 370 to activate skip selector 368. Activation of skip selector 368 by user 126 results in generation of rejection data 148, which may be received by content promotion software code 110/210a or 210b, executed by respective hardware processor 104/204 or 254. In that case, hardware processor 104/204 or 254 may further execute respective content promotion software code 110/210a or 210b to terminate playout of content clip 122a/222a/322a and automatically begin playout of a second content clip, such as one of content clips 122b/222b/322b and 122c/222c/322c.

As yet another alternative, in use cases in which user 126 prefers to surf among all content clips that have been curated for him or her, user 126 may utilize cursor 370 to select content clip guide 380 to be shown a menu of all links to content available to viewer 126, i.e., content clip links 382a-382f. In that use case, user interface 114/214a/214b/314 may present one of exemplary content clip guides 380A or 380B enabling user 126 to identify and select a content clip for immediate viewing.

It is noted that although the description above refers to use of cursor 370 by user 126, that characterization is merely exemplary. More generally, user 126 may interact with user interface 114/214a/214b/314 in any of a number of different ways. For example, in use cases in which personal communication device 150/250 is a smartphone or tablet computer, user 126 may interact with user interface 114/214a/214b/314 via a touchscreen of personal communication device 150/250, rather than through use of cursor 370. By analogy, in use cases in which personal communication device 150/250 is a smart TV, user 126 may interact with user interface 114/214a/214b/314 wirelessly, via a remote controller of the smart TV for example, or by selecting one or more buttons or other mechanical inputs to the smart TV console, rather than through use of cursor 370.

Although not included in the exemplary outline provided by flowchart 490, in some implementations the present can continue with determining first content clip 122a/222a/322a of content clips 122a/222a/322a, 122b/222b/322b, and 122c/222c/322c for automatic playout to user 126 via user interface 114/214a/214b/314. In some implementations, first content clip 122a/222a/322a may be determined through random selection from among content clips 122a/222a/322a, 122b/222b/322b, and 122c/222c/322c. However, in other implementations, determination of first content clip 122a/222a/322a may be performed based on the length of content clip 122a/222a/322a, e.g., shorter clips played out before longer clips, or vice versa.

In still other implementations, determination of first content clip 122a/222a/322a may be performed based on its relative likelihood to be desirable to user 126, i.e., content clips determined to be more likely to be desirable to user 126 played out before content clips determined to be less likely to be desirable to user 126. In some implementations, the relative desirability of content clips 122a/222a/322a, 122b/222b/322b, and 122c/222c/322c may be determined in a manner analogous to that described above by reference to action 493.

In implementations in which content clips 122a/222a/322a, 122b/222b/322b, and 122c/222c/322c are obtained from content clip library 120/220 by content promotion software code 110/210a, hardware processor 104/204 may further execute content promotion software code 110/210a to determine first content clip 122a/222a/322a for playout to user 126. However, in implementations in which content clips 122a/222a/322a, 122b/222b/322b, and 122c/222c/322c are obtained from content clip library 120/220 by content promotion software code 210b, hardware processor 254 may further execute content promotion software code 210b to determine first content clip 122a/222a/322a for playout to user 126.

In some implementations, the method outlined by flowchart 490 may further include automatically beginning playout of first content clip 122a/222a/322a. In one implementation, hardware processor 104/204 may execute content promotion software code 110/210a to stream first content clip 122a/222a/322a to personal communication device 150/250 via communication network 108 and network communication links 118/218. In those implementations, playout of first content clip 122a/222a/322a may further include rendering first content clip 122a/222a/322a on display 158/258 of personal communication device 150/250.

In implementations in which content clips 122a/222a/322a, 122b/222b/322b, and 122c/222c/322c are obtained from content clip library 120/220, content clips 122a/222a/322a, 122b/222b/322b, and 122c/222c/322c may be stored in memory 256 of personal communication device 150/250 prior to being played out. In those implementations, first content clip 122a/222a/322a is determined by content promotion software code 210b, executed by hardware processor 254, and is automatically played out by being rendered on display 158/258. Consequently, in some implementations, the systems and methods disclosed in the present application can automatically immerse user 126 in a content consumption experience that is likely to establish affinity for one or more of content items 142a, 142b, or 142c by user 126.

In some implementations, hardware processor 104/204 or 254 may further execute respective content promotion software code 110/210a or 210b to improve its performance through machine learning. For example, content promotion software code 110/210a/210b may track inputs to user interface 114/214a/214b/314 by user 126 and record which content clips are rejected and/or for how long user 126 watches the content clip. That information can be used as feedback to recommendation module 112/212a/212b to better learn the viewing behavior of user 126.

One or more of a variety of viewing metrics associated with the surf mode can be used to better learn the behavior of user 126 and provide future recommendations. For example, recommendation module 112/212a/212b of content promotion software code 110/210a/210b can learn which type of content clips are displeasing to user 126 based on what point in the content clip they begin to lose interest. Other options can be used to mark a content item and/or its corresponding content clip, which can further facilitate recommendations. For instance, surf mode can also incorporate a "watch later" or "remind me later" option. Additional metrics centered around the use of that function can also apply, such as when user 126 actually watches the content item later or if the reminder to watch later is ignored.

Thus, the present application discloses systems and methods for promoting content through the automated curation of content clips. By utilizing consumption history data specific to a user, or consumption history data for a demographic associated with the user, the present application discloses an automated content curation solution capable of identifying content likely to be desirable to the user. In addition, by using the consumption history data or associated demographic consumption history data to identify a portion of the desirable content likely to be most desirable to the consumer, the present solution advantageously isolates the portion of the content most likely to attract the user to the content. Moreover, by obtaining a content clip including the content portion likely to be most desirable to the user for playout to the user, the present solution increases the likelihood that content determined to be desirable to a user will actually be consumed and enjoyed by the user.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A content curation system comprising:
a computing platform including a hardware processor and a system memory;
a content promotion software code stored in the system memory;
the hardware processor configured to execute the content promotion software code to:
provide a user interface to a user;
receive, via the user interface, an initiation signal corresponding to an action by the user;
in response to receiving the initiation signal, identify a plurality of content items as desirable content items to the user;
for each one of the desirable content items, determine a respective portion of each one of the desirable content items as a respective most desirable content to the user, wherein the respective portion of each one of the desirable content items is determined based on one or more respective annotations used to tag the respective portion of each one of the desirable content items;
for each one of the desirable content items, obtain a content clip including the respective most desirable content, resulting in a plurality of content clips corresponding respectively to the plurality of content items; and
output the plurality of content clips for playout to the user via the user interface.

2. The content curation system of claim 1, wherein the hardware processor is further configured to execute the content promotion software code to:
determine a first content clip of the plurality of content clips for playout to the user via the user interface; and
begin playout of the first content clip starting from the respective most desirable content of the first content clip to the end of the respective desirable content item of the first content clip.

3. The content curation system of claim 2, wherein the user interface is configured, while the first content clip is being played, to receive an input from the user to play the respective desirable content item of the first content clip from the beginning of the respective desirable content item of the first content clip.

4. The content curation system of claim 1, wherein outputting the plurality of content clips for playout to the user comprises streaming at least one of the plurality of content clips to the user.

5. The content curation system of claim 1, further comprising a display, wherein the hardware processor is further configured to render at least one of the plurality of content clips on the display.

6. The content curation system of claim 1, wherein the plurality of content clips are video clips.

7. The content curation system of claim 1, wherein the plurality of content items comprise at least one of movies and episodes of television programming content.

8. The content curation system of claim 1, wherein the computing platform is part of a personal communication device.

9. A method for use by a content curation system including a computing platform having a hardware processor and a system memory storing a content promotion software code, the method comprising:
providing, using the hardware processor, a user interface to a user;
receiving, via the user interface using the hardware processor, an initiation signal corresponding to an action by the user;
identifying, using the hardware processor and in response to receiving the initiation signal, a plurality of content items as desirable content items to the user;
for each one of the desirable content items, determining, using the hardware processor, a respective portion of each one of the desirable content items as a respective most desirable content to the user, wherein the respective portion of each one of the desirable content items is determined based on one or more respective annotations used to tag the respective portion of each one of the desirable content items;
for each one of the desirable content items, obtaining, using the hardware processor, a content clip including the respective most desirable content, resulting in a plurality of content clips corresponding respectively to the plurality of content items; and
outputting, using the hardware processor, the plurality of content clips for playout to the user via the user interface.

10. The method of claim 9, further comprising:
determining, using the hardware processor, a first content clip of the plurality of content clips for playout to the user via the user interface; and
beginning playout of the first content clip starting from the respective most desirable content of the first content clip to the end of the respective desirable content item of the first content clip.

11. The method of claim 10, further comprising:
while the first content clip is being played, receiving an input from the user, via the user interface, to play the respective desirable content item of the first content clip from the beginning of the respective desirable content item of the first content clip.

12. The method of claim 9, wherein outputting the plurality of content clips for playout to the user comprises streaming at least one of the plurality of content clips to the user.

13. The method of claim 9, wherein the content curation system further comprises a display, wherein the method further comprises rendering, using the hardware processor, at least one of the plurality of content clips on the display.

14. The method of claim 9, wherein the plurality of content clips are video clips.

15. The method of claim 9, wherein the plurality of content items comprise at least one of movies and episodes of television programming content.

16. The method of claim 9, wherein the computing platform is part of a personal communication device.

17. A computer-readable non-transitory medium having stored thereon a content promotion software code including instructions, which when executed by a hardware processor, instantiate a method comprising:
   providing a user interface to a user;
   receiving, via the user interface, an initiation signal corresponding to an action by the user;
   in response to receiving the initiation signal, identifying a plurality of content items as desirable content items to the user;
   for each one of the desirable content items, determining a respective portion of each one of the desirable content items as a respective most desirable content to the user, wherein the respective portion of each one of the desirable content items is determined based on one or more respective annotations used to tag the respective portion of each one of the desirable content items;
   for each one of the desirable content items, obtaining a content clip including the respective most desirable content, resulting in a plurality of content clips corresponding respectively to the plurality of content items; and
   outputting the plurality of content clips for playout to the user via the user interface.

18. The computer-readable non-transitory medium of claim 17, wherein the method further comprises:
   determining a first content clip of the plurality of content clips for playout to the user via the user interface; and
   beginning playout of the first content clip starting from the respective most desirable content of the first content clip to the end of the respective desirable content item of the first content clip.

19. The computer-readable non-transitory medium of claim 18, wherein the method further comprises:
   while the first content clip is being played, receiving an input from the user, via the user interface, to play the respective desirable content item of the first content clip from the beginning of the respective desirable content item of the first content clip.

20. The computer-readable non-transitory medium of claim 17, wherein outputting the plurality of content clips for playout to the user comprises streaming at least one of the plurality of content clips to the user.

\* \* \* \* \*